United States Patent [19]
Zehavi et al.

[11] Patent Number: 6,044,074
[45] Date of Patent: Mar. 28, 2000

[54] RAPID SIGNAL ACQUISITION AND SYNCHRONIZATION FOR ACCESS TRANSMISSIONS

[75] Inventors: Ephraim Zehavi, Haifa, Israel; Gordon Skinner, deceased, late of Boulder; by Margo Boodakian, executrix, Lyons, both of Colo.

[73] Assignee: Qualcomm Incorporated, San Diego, Calif.

[21] Appl. No.: 09/098,631

[22] Filed: Jun. 16, 1998

Related U.S. Application Data

[60] Provisional application No. 60/065,194, Nov. 12, 1997.

[51] Int. Cl.⁷ .............................. H04B 7/216; H04J 7/06
[52] U.S. Cl. ............................. 370/350; 375/335
[58] Field of Search ...................... 370/335, 342, 370/350, 479, 503, 514, 515, 510, 513, 203, 206, 320, 441, 509; 375/200, 206

[56] References Cited

U.S. PATENT DOCUMENTS

| | | | |
|---|---|---|---|
| 5,103,459 | 4/1992 | Gilhousen et al. | 375/1 |
| 5,805,648 | 9/1998 | Sutton | 375/367 |
| 5,862,172 | 1/1999 | Sugita et al. | 375/200 |

FOREIGN PATENT DOCUMENTS

98/49857  11/1998  WIPO .

*Primary Examiner*—Michael Horabik
*Assistant Examiner*—Kevin C. Harper
*Attorney, Agent, or Firm*—Russell Ben Miller; Gregory D. Ogrod

[57] ABSTRACT

A system and method for rapidly acquiring timing of an access transmission that uses an access probe that is transmitted in stages. A first stage of the access probe is spread with a short pseudonoise (PN) code pair. A second stage of the access probe is spread with both the short PN code pair and a long PN code. Transmitting the access probe in stages reduces the number of hypotheses, and hence the time, required by a receiver attempting to acquire the access probe.

21 Claims, 9 Drawing Sheets

RAPID SIGNAL ACQUISITION AND SYNCHRONIZATION FOR ACCESS TRANSMISSIONS

This application claims the benefit of U.S. Provisional Application No. 60/065,194 filed Nov. 12, 1997.

BACKGROUND OF THE INVENTION

I. Field of the Invention

The present invention relates to multiple access, spread spectrum communication systems and networks. More particularly, the present invention relates to resolving timing uncertainty in received access channel transmissions in a spread spectrum communication system.

II. Description of the Related Art

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title *"Spread Spectrum Multiple Access Communication System Using Satellite or Terrestrial Repeaters,"* and U.S. Pat. No. 5,691,974, which issued Nov. 25, 1997, under the title *"Method And Apparatus For Using Full Spectrum Transmitted Power In A Spread Spectrum Communication System For Tracking Individual Recipient Phase Time And Energy,"* both of which are assigned to the assignee of the present invention and incorporated herein by reference.

The above-mentioned patents disclose multiple access communication systems in which a large number of generally mobile or remote system users each employ at least one transceiver to communicate with other system users or users of other connected systems, such as a public telephone switching network. The transceivers communicate through gateways and satellites, or terrestrial base stations (also sometimes referred to as cell-sites or cells).

Base stations cover cells, while satellites cover footprints or spots on the surface of the Earth. In either system, capacity gains can be achieved by sectoring, or subdividing, the geographical regions being covered. Cells can be divided into "sectors" by using directional antennas at the base station. Similarly, a satellite's footprint can be geographically divided into "beams," through the use of beam forming antenna systems. These techniques for subdividing a coverage region can be thought of as creating isolation using relative antenna directionality or space division multiplexing. In addition, provided there is available bandwidth, each of these subdivisions, either sectors or beams, can be assigned multiple CDMA channels through the use of frequency division multiplexing (FDM). In satellite systems, each CDMA channel is referred to as a "sub-beam," because there may be several of these per "beam."

In communication systems employing CDMA, separate links are used to transmit communication signals to and from a gateway or base station. A forward link refers to the base station- or gateway-to-user terminal communication link, with signals originating at the gateway or base station and being transmitted to a system user, or users. A reverse link refers to the user terminal-to-gateway or -base station communication link, with signals originating at a user terminal and being transmitted to the gateway or base station.

The reverse link is comprised of at least two separate channels: an access channel and a reverse traffic channel. An access channel is used by one or more user terminals, separated in time, to initiate or respond to communications from the gateway or base station. This communication process is referred to as an access transmission or as an "access probe." A reverse traffic channel is used for the transmission of user and signaling information from the user terminal to one or more gateways or base stations during a "call" or call setup. A structure or protocol for accesses channels, messages, and calls is illustrated in more detail in the Telecommunications Industry Association IS95 standard entitled *"Mobile Station-Base-Station Compatibility Standard For Dual-Mode Wideband Spread Spectrum Cellular System,"* which is incorporated herein by reference.

In a typical spread-spectrum communication system, one or more preselected pseudo-noise (PN) code sequences are used to modulate or "spread" user information signals over a predetermined spectral band prior to modulation onto a carrier for transmission as communication signals. PN spreading, a method of spread-spectrum transmission that is well known in the art, produces a signal for transmission that has a bandwidth much greater than that of the data signal. In the forward link, PN spreading codes or binary sequences are used to discriminate between signals transmitted by different base stations or over different beams, as well as between multipath signals. These codes are typically shared by all communication signals within a given cell, beam, or sub-beam.

In some communication systems, the same set of forward link PN spreading codes are also used in the reverse link, for both the reverse link traffic and the access channels. In other proposed communication systems, different sets of PN spreading codes are used between the forward link and the reverse link. In still other communication systems, different sets of PN spreading codes have been proposed for use between the reverse link traffic and access channels.

The PN spreading is accomplished using a pair of pseudonoise (PN) code sequences, or PN code pair, to modulate or "spread" information signals. Typically, one PN code sequence is used to modulate an in phase (I) channel while the other PN code sequence is used to modulate a quadrature phase (Q) channel. This PN modulation or encoding occurs before the information signals are modulated by a carrier signal and transmitted by the gateway or base station as communication signals on the forward link. The PN spreading codes are also sometimes referred to as short PN codes or sequences because they are relatively "short" when compared with other PN codes or code sequences used by the communication system.

A particular communication system may use several lengths of short PN code sequences depending on whether the forward link or the reverse link channels are being used. For the forward link, the short PN codes typically have a length from $2^{10}$ to $2^{15}$ chips. These short PN codes are used to distinguish between signals transferred by the various satellites, or gateways and base stations. In addition, timing offsets of a given short PN code are used to discriminate between beams of a particular satellite, or cells.

For the reverse link in a satellite system, the short PN codes have a sequence length on the order of $2^8$ chips. These short PN sequences are used to enable a gateway receiver to quickly search out user terminals that are trying to access the communication system without the complexity associated with the "longer" short PN codes used in the forward link. For purposes of this discussion, "short PN codes" refer to the short PN code sequences ($2^8$ chips) used in the reverse link.

Another PN code sequence, referred to as a channelizing code, is used to discriminate between communication signals transmitted by different user terminals within a cell or sub-beam. The PN channelizing codes are also referred to as long codes because they are relatively "long" when compared with other PN codes used by the communication system. The long PN code typically has a length on the order of $2^{42}$ chips. Typically, an access message is modulated by the long PN code, or a specific "masked" version of such a code, prior to being modulated by the short PN code and subsequently transmitted as an access probe to the gateway or base station. However, the short PN code and the long PN code may also be combined prior to modulating an access message.

When a receiver at the gateway or base station receives an access probe, the receiver must despread the access probe to obtain the access message. This is accomplished by forming hypotheses, or guesses, as to which long PN codes and which short PN code pair modulated the received access message. A correlation between a given hypothesis and the access probe is generated to determine which hypothesis is the best estimate for the access probe. The hypothesis that produces the greatest correlation, generally relative to a predetermined threshold, is the selected hypothesis. Once the appropriate hypothesis is determined, the access probe is despread using the selected hypothesis to obtain the access message.

This timing uncertainty poses a problem for spread spectrum communication systems. This timing uncertainty corresponds to an uncertainty in the start of the PN code sequences, that is the starting point or timing of the code. As the timing uncertainty increases, more hypotheses have to be formed to determine the start of the PN code sequences. Proper demodulation of signals in these communication systems hinges on "knowing" where the various PN code sequences start in the received signal. Failure to recognize the start of the PN code sequences, or properly synchronize to their respective timing, results in failure to demodulate the received signal.

However, in satellite communication systems an access probe is particularly difficult to acquire, due to the changing distance between the user terminal and the satellite repeater. As the satellite orbits the Earth, the distance between the user terminal and the satellite varies considerably. The maximum distance occurs when the satellite is located at a horizon with respect to the user terminal. The minimum distance occurs when the satellite is located directly overhead of the user terminal. This variance in the distance creates an uncertainty in the one-way (i.e., from the user terminal to the gateway) timing of the access probe of up to 20 milliseconds (ms). Depending on the system, this uncertainty could be much more.

In order to resolve the timing uncertainty, the gateway receiver may have to search tens of thousands of hypotheses. This search may take several seconds to accomplish, resulting in a delay in establishing a communication link that is unacceptable to the user. Furthermore, due to the limited number of channels in the communication system, a particular user may actually lose an opportunity to access the communication system for several minutes because one or more other users establish a link or call first.

A similar situation arises in communication systems that employ a slotted ALOHA access signal protocol or technique. In this technique, the access channel is divided into a series of fixed length frames or time slots used for receiving signals. The access signals are generally structured as "packets", that consist of a preamble and a message portion, that must arrive at the beginning of a time slot to be acquired. A failure to acquire an access probe during a particular frame period results in the transmitter desiring access having to re-send the access probe to allow the receiver to detect the probe again during a subsequent frame. Multiple access signals arriving together "collide" and are not acquired, requiring both to be resent. In either case, the timing of subsequent access transmissions when the initial attempt fails is based on a delay time equal to a random number of time slots or frames. The length of the delay in probe acquisition is increased by any delay in resetting acquisition circuits in the receiver to scan the various hypothesis, and in other probes being acquired first, as mentioned Ultimately, the access probe may never, at least not within a practical time limit, be acquired if the timing uncertainty is not resolved.

What is needed is a system and method for rapidly acquiring the access probe in spread spectrum communication systems, in the presence of anticipated timing uncertainties.

SUMMARY OF THE INVENTION

The present invention is a novel and improved system and method for rapidly acquiring and synchronizing an access probe from a user terminal transmitting in a spread spectrum communication system. Rather than initially spreading the access probe with both a short pseudonoise (PN) code pair and a long PN code, the access probe is spread in stages. During a first stage, the preamble of the access probe, comprised of null data, is initially spread with only the short PN code pair. During a second stage, the preamble of the access probe is spread with both the short PN code pair and the long PN code.

The purpose of spreading the access probe in stages is to reduce the overall number of hypotheses required by a receiver to resolve a timing uncertainty in the access probe. During the first stage of the access probe, the receiver employs a coarse search function or operation to determine the short PN code pair that modulated the null data of the preamble. The determination of the short PN code pair partially resolves the timing uncertainty as a function of the length of the short PN code pair.

During the second stage of the access probe and after the receiver has determined the short PN code pair being used, the receiver employs a fine search function or operation to determine the long PN code that modulated the null data of the preamble which is also spread by both the short PN code pair and the long PN code. The determination of the long PN code completely resolves the timing uncertainty of the access probe.

A feature of the present invention is to reduce the overall number of hypotheses required by the receiver in acquiring an access signal or probe. The reduction in the number of hypotheses results in a reduction in the amount of time necessary to acquire the access probe. Thus, the user terminal experiences a significantly shorter delay in accessing the communication system when compared to systems employing conventional techniques. The reduction in the number of hypotheses also increases the probability of establishing a connection between the user terminal and the gateway.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is directed to a system and method for rapidly acquiring an access probe in a spread spectrum communication system. In one embodiment of the present invention, the access probe being acquired is transmitted by a user terminal or mobile station to a gateway or base station.

In a typical CDMA communication system, a base station within a predefined geographical region, or cell, uses either several spread spectrum modems or transmitter and receiver modules to process communication signals for system users within the service area of the base station. Each receiver module generally employs a digital spread spectrum data receiver and at least one searcher receiver as well as associated demodulators, etc. During typical operations, a particular transmitter module and a particular receiver module, or a modem, in the base station are assigned to a user terminal to accommodate transfer of communication signals between the base station and the user terminal. In some cases, multiple receiver modules may be used to accommodate diversity signal processing.

For communication systems employing satellites, the transmitter and receiver modules are generally placed in base stations referred to as gateways or hubs that communicate with system users by transferring communication signals through the satellites. In addition, there may be other associated control centers that communicate with the satellites or the gateways to maintain system wide traffic control and signal synchronization.

I. System Overview

Figure 1:
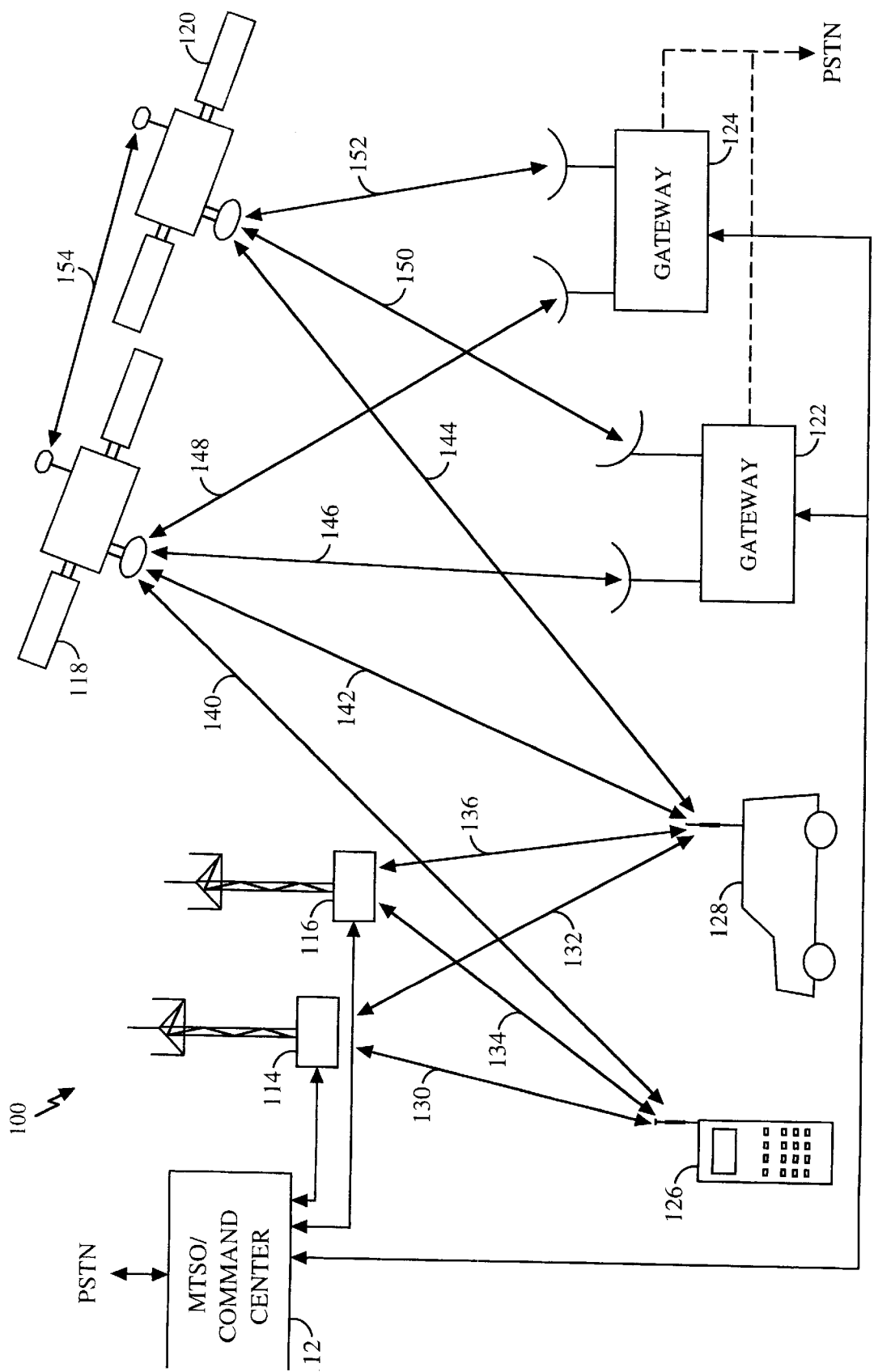
FIG. 1 is an exemplary wireless communication system constructed and operating according to one embodiment of the present invention.

An example of a wireless communication system constructed and operating according to the present invention is illustrated in FIG. 1. A communication system 100 utilizes spread spectrum modulation techniques in communicating with user terminals (shown as user terminals 126 and 128) having wireless data terminals or telephones. In terrestrial systems, communication system 100 communicates with user terminals 126 and 128 via system base stations (shown as base stations 114 and 116). Cellular telephone type systems in large metropolitan areas may have hundreds of base stations 114 and 116 serving thousands of user terminals 126 and 128 using terrestrial based repeaters.

Mobile stations or user terminals 126 and 128 each have or comprise a wireless communication device such as, but not limited to, a cellular telephone, a data transceiver or transfer device (e.g., computers, personal data assistants, facsimile), or a paging or position determination receiver. Typically, such units are either hand-held or vehicle mounted as desired. While these user terminals are discussed as being mobile, it is also understood that the teachings of the invention are applicable to fixed units or other types of terminals where remote wireless service is desired. This latter type of service is particularly suited to using satellites to establish communication links in many remote areas of the world.

Exemplary user terminals are disclosed in U.S. Pat. No. 5,691,974 referenced above, and U.S. patent application Ser. Nos. 08/627,830 entitled "*Pilot Signal Strength Control For A Low Earth Orbiting Satellite Communications System,*" and 08/723,725 entitled "*Unambiguous Position Determination Using Two Low-Earth Orbit Satellites,*" which are incorporated herein by reference.

In satellite-based systems, communication system 100 employs satellites (shown as satellites 118 and 120) and system gateways (shown as gateways 122 and 124) to communicate with user terminals 126 and 128. Gateways 122 and 124 send communication signals to user terminals 126 and 128 through satellites 118 and 120. Satellite-based systems generally employ fewer satellites to service more users over a larger geographical region.

It is contemplated for this example that the satellites provide multiple beams directed to cover separate generally non-overlapping geographic regions. Multiple beams at different frequencies, also referred to as CDMA channels, 'sub-beams', or FDM signals, frequency slots or channels, can be directed to overlap the same region. However, it is readily understood that the beam coverage or service areas for different satellites, or antenna patterns for terrestrial cell-sites, may overlap completely or partially in a given region depending on the communication system design and the type of service being offered. Diversity or hand-offs may also be achieved between any of these communication regions or devices. For example, each may provide service to different sets of users with different features at different frequencies, or a given mobile unit may use multiple frequencies and/or multiple service providers, each with overlapping geophysical coverage.

As illustrated in FIG. 1, communication system 100 uses a system controller and switch network 112, also referred to as a mobile telephone switching office (MTSO) in terrestrial systems and (ground) command and control centers for satellite systems. Such controllers typically include interface and processing circuitry for providing system-wide control for base stations 114 and 116 or gateways 122 and 124. Controller 112 also generally has master control over routing of telephone calls among a public switched telephone network (PSTN), base stations 114 and 116 or gateways 122 and 124, and mobile units 126 and 128. However, a PSTN interface generally forms part of each gateway for direct connection to such communication networks or links. The communication link that couples controller 112 to various system base stations 114 and 116 or gateways 122 and 124 can be established using known techniques such as, but not limited to, dedicated telephone lines, optical fiber links, or microwave or dedicated satellite communications links.

In FIG. 1, some of the possible signal paths for communication links between base stations 114 and 116 and user terminals 126 and 128 are illustrated as lines 130, 132, 134, and 136. The arrowheads on these lines illustrate exemplary signal directions for the link, as being either a forward or a reverse link, and serve as illustration only for purposes of clarity and not as any restriction on the actual signal pattern.

In a similar manner, signal paths for communication links among gateways 122 and 124, satellites 118 and 120, and user terminals 126 and 128 are illustrated as lines 146,148, 150, and 152 for gateway-to-satellite links and as lines 140, 142, and 144 for satellite-to-user links. In some configurations, it may also be possible and desirable to establish direct satellite-to-satellite links exemplified by line 154.

As will be apparent to one skilled in the art, the present invention is suited for either terrestrial-based systems or satellite-based systems. Thus, gateways 122 and 124 and base stations 114 and 116 will henceforth be collectively referred to as gateway 122 for clarity. Likewise, satellites 118 and 120 will be collectively referred to as satellite 118, and user terminals 126 and 128 will be collectively referred to as user terminal 126. In addition, while user terminal 126 is discussed as being 'mobile', it is understood that the teachings of the present invention are applicable to fixed units desiring remote wireless service.

While only two satellites are illustrated in FIG. 1, the communication system generally employs multiple satellites traversing different orbital planes. A variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations, including other orbital distances and constellations.

The terms base station and gateway are sometimes used interchangeably in the art, with gateways being perceived as specialized base stations that direct communications through satellites and have more 'functions,' with associated equipment, to perform to maintain such communication links through moving repeaters, while base stations use terrestrial antennas to direct communications within a surrounding geographical region. Central control centers will also typically have more functions to perform when interacting with gateways and satellites. User terminals are also sometimes referred to as subscriber units, mobile units, mobile stations, or simply "users," "mobiles," or "subscribers" in some communication systems, depending on preference.

II. Communication Links

Figure 2:
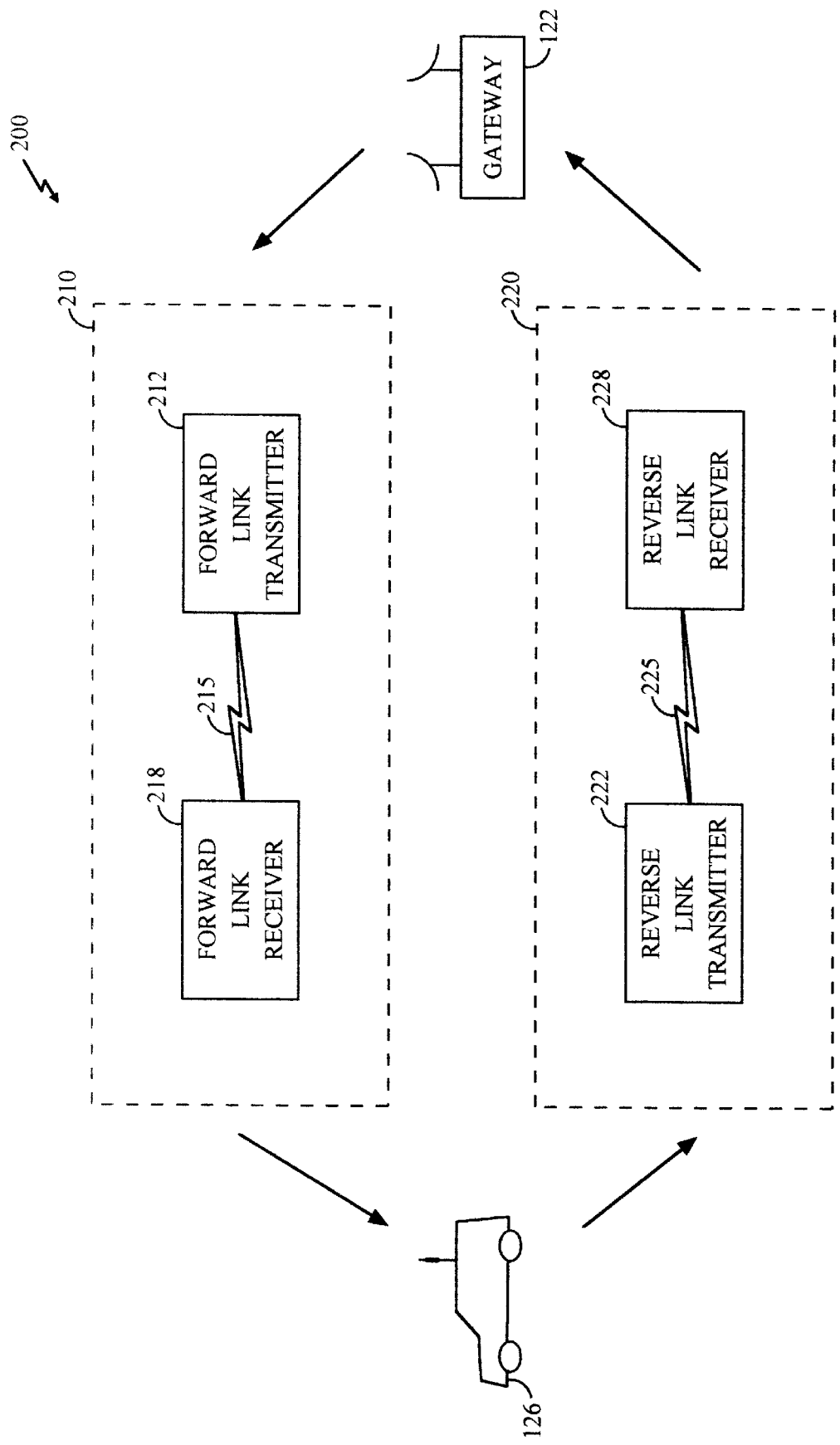
FIG. 2 is an exemplary implementation of communication links used between a gateway and a user terminal in a communication system.

FIG. 2 illustrates an example implementation of communication links used between a gateway 122 and a user terminal 126 in communication system 100. At least, and generally, two links are employed in communication system 100 to facilitate the transfer of communication signals between gateway 122 and user terminal 126. These links are referred to as a forward link 210 and a reverse link 220. Forward link 210 handles transmission signals 215 that are transmitted from gateway 122 (or base stations) to user terminal 126. Reverse link 220 handles transmission signals 225 that are transmitted from user terminal 126 to gateway 122 (or base station).

Forward link 210 includes a forward link transmitter 212 and a forward link receiver 218. In one embodiment, forward link transmitter 212 is implemented in gateway 122 (base station) according to well-known CDMA communication techniques as disclosed in the above referenced patents. In one embodiment, forward link receiver 218 is implemented in user terminal 126 according to well-known CDMA communication techniques as disclosed in the above referenced patents.

Reverse link 220 includes a reverse link transmitter 222 and a reverse link receiver 228. In one embodiment, reverse link transmitter 222 is implemented in user terminal 126. In one embodiment, reverse link receiver 228 is implemented in gateway 126 (base station).

Reverse link 220 is comprised of at least two channels: one or more access channels and one or more reverse traffic channels. These channels may be implemented with different receivers or the same receiver operating in separate modes. As discussed above, an access channel is employed by user terminals 126 to initiate or respond to communications with gateway 122. A separate access channel is required at any given time for each active user. In particular, access channels are time shared by several user terminals 126 with transmissions from each active user being separated in time from one another. Systems may employ one or more access channels depending upon known factors such as a desired level of gateway complexity and access timing. Proposed embodiments employ from 1 to 8 access channels per frequency. The access channel is discussed in further detail below.

III. Access Channel

Figure 3:
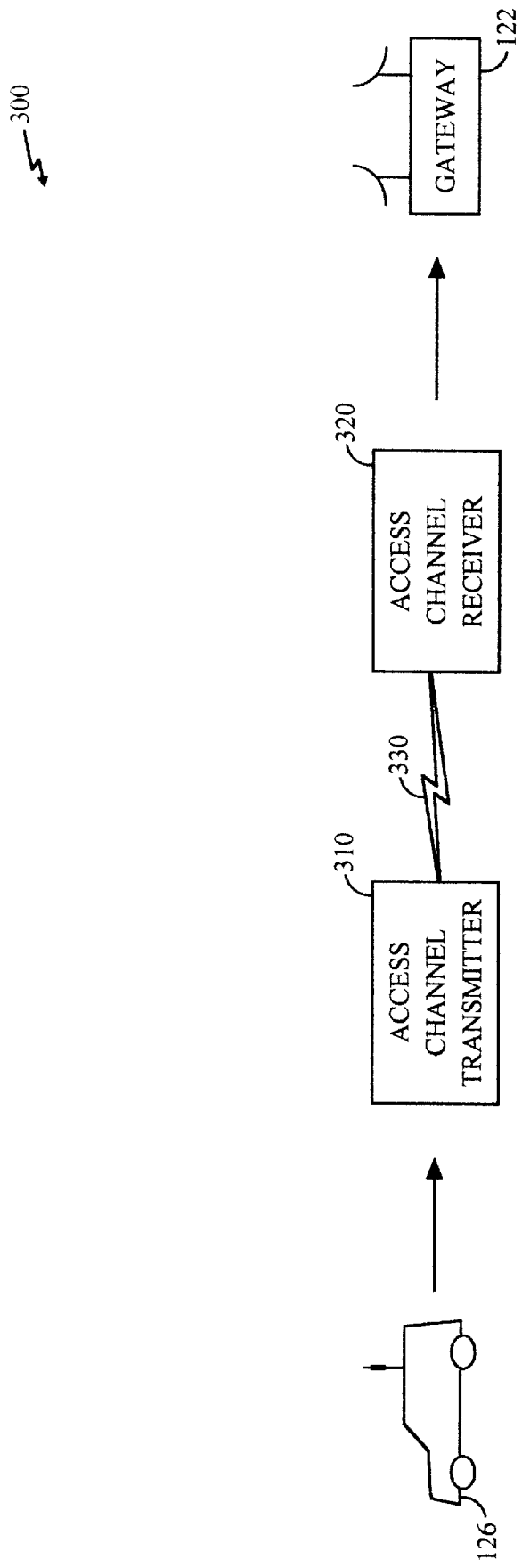
FIG. 3 is an access channel in further detail.

FIG. 3 illustrates an access channel 300 in further detail. Access channel 300 includes an access channel transmitter 310, an access channel receiver 320, and an access probe 330. Access channel transmitter 310 is included in reverse link transmitter 222 described above. Access channel receiver 320 is included in reverse link receiver 228 described above.

Access channel 300 is used for short signaling message exchanges including call origination, responses to pages, and registrations originated from user terminal 126 and destined for gateway 122. In order for user terminal 126 to initiate or respond to communications with gateway 122 (or base stations) over access channel 300, a signal referred to as an access signal or access probe 330 is sent.

An access channel is also generally associated with one or more particular paging channels used in the communication system. This makes responses to paging messages more efficient in terms of the system knowing where to look for user terminal access transmissions in response to pages. The association or assignment may be known based on a fixed system design, or indicated to user terminals within the structure of paging messages. As is known, using a slotted access channel approach, the access channel is divided into a series of fixed length frames or time slots during which access transmissions or probes can be received from user terminals.

IV. Timing Uncertainty in Access Probe

An uncertainty in the timing of access probe 330 arises due to the changing distance or propagation path length between user terminal 126 and satellite repeater 118 as a result of the orbit of satellite 118 around the Earth. This timing uncertainty is bounded by a minimum propagation delay and a maximum propagation delay. The minimum propagation delay, $D_{min}$, is the amount of time for a signal to travel from user terminal 126 to satellite 118 when satellite 118 is directly overhead of user terminal 126. The maximum propagation delay, $D_{max}$, is the amount of time for a signal to travel from user terminal 126 to satellite 118 when satellite 118 is located at a predetermined useful horizon of user terminal 126. In a similar manner, some degree of timing uncertainty can arise for relative motion between a user terminal and base station 114, although generally of lesser magnitude.

Resolving the timing uncertainty is necessary in order to properly acquire access probe 330. Specifically, the timing (i.e., the time of the start of the PN codes) must be known in order to despread access probe 330, or its message content, using the long and short PN codes. This is done by correlating the access signal forming access probe 330 with various timing hypotheses to determine which timing hypothesis is the best estimate for resolving access probe 330. The timing hypotheses are offset in time from one another and represent various estimates of the timing of access probe 330, or of the PN codes used to generate the probe. The hypothesis that generates the highest correlation with access probe 330, generally one that exceeds a predetermined threshold, is the hypothesis with the most likely estimate (assumed "correct") of the timing for that particular access probe 330. Once the timing uncertainty is resolved in this manner, access probe 330 can be despread using the timing estimate and the long and short PN codes according to well known techniques.

V. Conventional Protocol for Transmitting an Access Probe

Figure 4:
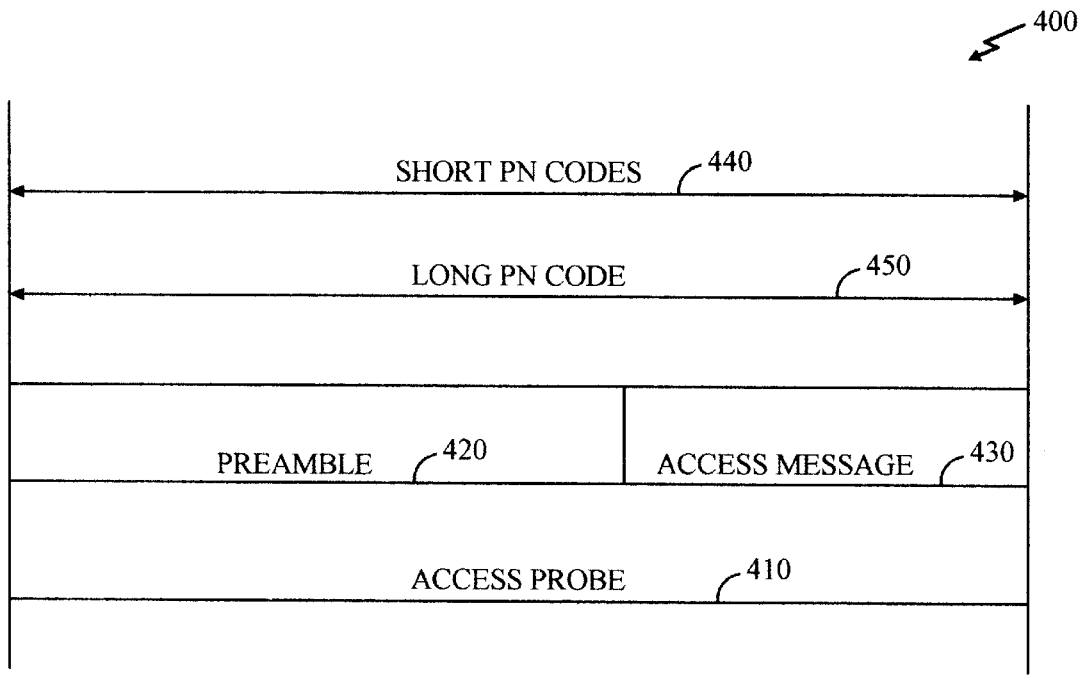
FIG. 4 is a conventional protocol for transmitting an access probe in typical CDMA communication systems.

FIG. 4 illustrates a conventional signal structure or protocol 400 for transmitting a conventional access signal 410, also referred to as an access probe, over an access channel used in a conventional CDMA communication system. When a user terminal 126 desires to access communication system 100, that is, initiate or respond to communications, user terminal 126 transmits conventional access signal or probe 410 to gateway 122 according to conventional protocol 400. Conventional access probe 410 includes an access probe preamble (preamble) 420 and an access probe message (access message) 430. Conventional access probe 410 is transmitted by access channel transmitter 310 in user terminal 126 to access channel receiver 320 in gateway 122.

In a conventional spread spectrum system, preamble 420 and access message 430 are each quadrature spread with a pair of short pseudonoise code sequences (short PN code pair) 440 and channelized with a long pseudonoise code sequence (long PN code) 450. Preamble 420, typically comprised of null data (i.e., all "1"s or all "0"s, or a pre-selected pattern of "1's" and "0's"), is transmitted first to provide access channel receiver 320 with an opportunity to acquire access probe 410 prior to access message 430 being sent.

Short PN code pair 440 is used to modulate or "spread" information signals. Pseudonoise modulation or encoding occurs before the information signals are modulated by a carrier signal and transmitted to gateway 122. Short PN code pair 440 is used to discriminate between communication signals transmitted over specific CDMA channels. In one embodiment of the present invention, short PN code pair 440 is used to discriminate between access channel signals and other communication signals used in reverse link 220. According to one embodiment of the present invention, each gateway 122 uses its own short PN code pair 440. In other embodiments of the present invention, a different short PN code pair 440 is used for each frequency band within a gateway 122 based on an amount of communication traffic to be accommodated. In these embodiments, up to eight short PN code pairs 440 per gateway is contemplated. However, other numbers of PN code pairs, more or fewer, can be used for this function.

Long PN code 450 is used to discriminate between communication signals transmitted by different user terminals 126 within a cell or beam. Typically, in a conventional system, preamble 420 and access message 430 are modulated or encoded by long PN code 450 prior to being spread by short PN code pair 440. However, in other conventional systems, short PN code 440 and long PN code 450 may be combined and then used to modulate preamble 420 and access message 430.

When access channel receiver 320 receives preamble 420, access channel receiver 320 must despread preamble 420 using short PN code pair 440 and long PN code 450. This is accomplished by forming hypotheses, or guesses, as to which long PN codes 450 and which short PN code pair 440 modulated the null data included in preamble 420. A given hypothesis and preamble 420 are correlated together. The results of the correlation of preamble 420 with each of the hypotheses are compared. The particular hypothesis that generates the highest correlation, in terms of magnitude or energy, is the selected hypothesis. The particular long PN code 450 and the particular short PN code 440 that comprise this hypothesis are used to demodulate access probe 410. It may be necessary to repeat the transmission of access probe 410 in order to ensure acquisition.

Once short PN code pair 440 and long PN code 450 are determined by access channel receiver 320, conventional access probe 410 is referred to as being acquired. After preamble 420 has been transmitted for a predetermined period of time, access message 430 is transmitted by access channel transmitter 310. As discussed above, access message 430 is spread using the same short PN code pair 440 and long PN code 450 used to spread preamble 420 according to conventional protocol or access signal structure 400.

Preamble 420 must be of sufficient length so that access channel receiver 320 has time to process the hypotheses and acquire conventional access probe 410 before access message 430 is transmitted. Otherwise, access channel receiver 320 will still be attempting to acquire conventional access probe 410 while access message 430 is being transmitted. In this case, access message 430 will not be properly received. The time required to acquire access probe 410, referred to as acquisition time, varies depending on how many receivers are used in parallel to process the hypotheses, how long the various code sequences are, the range of timing uncertainty in the signal transmissions, and so forth. Each of these factors effects the number of hypotheses that must be formed and the time required to acquire the conventional access probe 410. In addition to the factors affecting acquisition time, the length and frequency of repetition of preamble 420 is selected in order to minimize collisions between access probes 410 transmitted by different user terminals 126. Each of these factors are considered based on system design considerations when determining the length of preamble 420 as would be apparent.

The present invention uses an access signal structure or protocol for transmitting an access probe that requires far fewer hypotheses to be formed than those required by conventional access probe 410. This access probe is discussed in further detail below.

Figure 5:
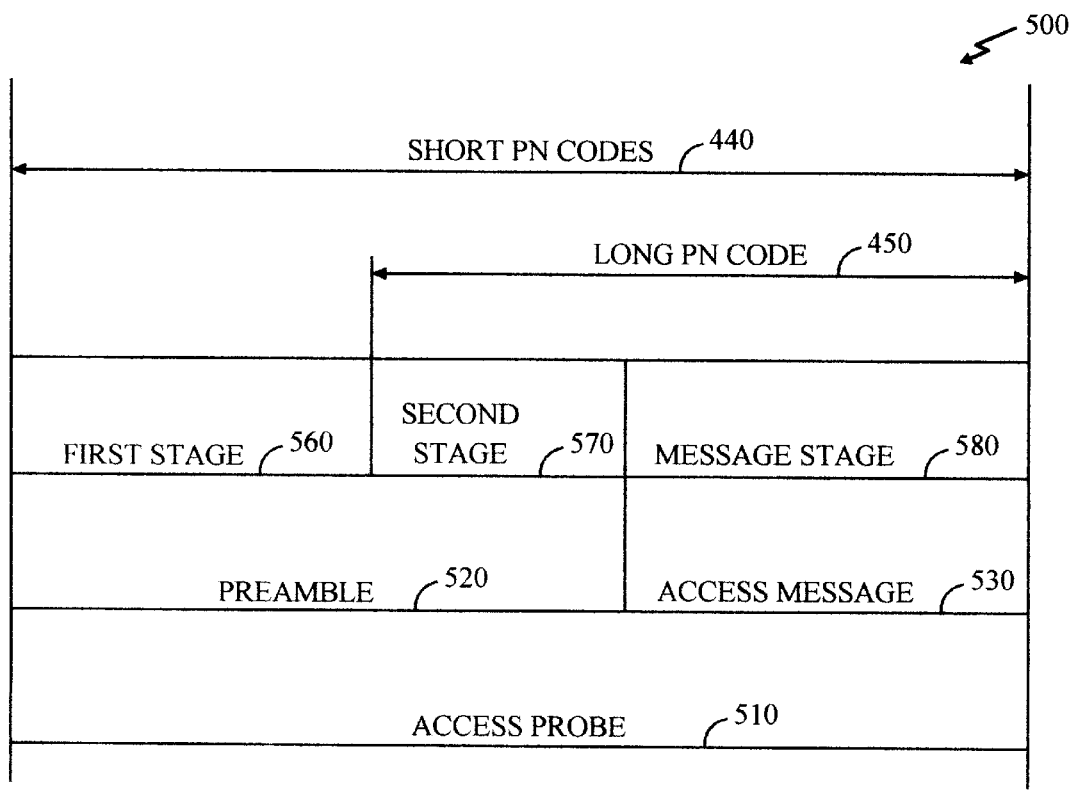
FIG. 5 is a protocol for transmitting an access probe according to one embodiment of the present invention.

VI. Protocol for Transmitting an Access Probe According to the Present Invention FIG. 5 illustrates a signal structure or protocol 500 for transmitting an access probe 510 according to one embodiment of the present invention. Access probe 510 includes an access probe preamble (preamble) 520 and an access probe message (access message) 530. One fundamental difference between protocol 500 and conventional protocol 400 is that preamble 510 is initially spread, or modulated, with only short PN code pair 440, and later modulated with both short PN code pair 440 and long PN code 450. This allows access channel receiver 320 to resolve the timing uncertainty using only short PN code pair 440. In contrast, conventional protocol 400 requires the use of both short PN code pair 440 and long PN code 450 to resolve timing uncertainty.

Modulating preamble 520 in stages, i.e. first with only short PN code pair 440 and subsequently with both short PN code pair 440 and long PN code 450, significantly reduces the number of hypotheses required by access channel receiver 320 to acquire access probe 510. By reducing the number of hypotheses, the time required by access channel receiver 320 to acquire access probe 510 (i.e., acquisition time) is correspondingly reduced.

According to the present invention, preamble 520 is transmitted in two stages: a first stage preamble 560, and a second stage preamble 570. In first stage preamble 560, preamble 520 is modulated by short PN code pair 440 for a sufficient length of time to allow access channel receiver 320 to determine the timing of short PN code pair 440.

In second stage preamble 570, preamble 520 is modulated by both short PN code pair 440 and long PN code 450. Second stage preamble 570 is transmitted by access channel transmitter 310 for a sufficient length of time to allow access channel receiver 320 to determine the timing of long PN code 450 timing. By the end of second stage preamble 570, access channel receiver 320 should have acquired access probe 510.

After second stage preamble 570, message stage 580 is transmitted in access channel transmitter 310. During message stage 580, message 530 is modulated by both short PN code pair 440 and long PN code 450.

By transmitting preamble 520 in stages, the number of hypotheses required to resolve the timing uncertainty and acquire access probe 510 is reduced. In a system employing conventional protocol 400, the number of hypotheses required is determined by multiplying the timing uncertainty by the chip rate because one hypothesis is required for each potential code start time (start of frame) of conventional access probe 410 over the duration of the timing uncertainty. In other words, each potential PN code timing (i.e., the time that the access probe started at) must be evaluated over the duration of the uncertainty.

In a preferred embodiment of the present invention, access channel receiver 320 partially resolves the timing uncertainty by first despreading first stage preamble 560 using an a priori known short PN code pair 440. Because short PN code pair 440 is expected to be much shorter than the timing uncertainty, the number of hypotheses required to acquire short PN code pair 440 is the number of code starting points or times possible for short PN code pair 440. Thus, for a short PN code pair 440 having a length of 256, the number of hypotheses required to acquire short PN code pair 440 is 256.

In a preferred embodiment of the present invention, access channel receiver 320 completely resolves the timing uncertainty by despreading second stage preamble 570 using both the a priori known short PN code pair 440 and an a priori known long PN code 450. After short PN code pair 440 is acquired, an ambiguity on the order of an integer number of lengths of short PN code pair 440 exists in the timing of access probe 510. In other words, short PN code pair 440 is repeated an integer number of times within the duration of the timing uncertainty. The number of repetitions is the number of hypotheses required to be formed during the transmission of second stage preamble 570. This number is determined by dividing the timing uncertainty by the period of short PN code pair 440.

The total number of hypotheses required by the present invention to resolve the timing uncertainty is determined as the sum of hypotheses required for each of first stage preamble 560 and second stage preamble 570. A comparison of the number of hypotheses required to resolve a timing uncertainty is illustrated in Table I. Table I compares the number of hypotheses required for a system employing conventional access probe 410 with a system employing access probe 510 having various short PN code lengths (L) according to the present invention. Table I is generated for an exemplary CDMA communication system having a chip rate of 1.2288 megachips per second and a timing uncertainty of 10 milliseconds. For this exemplary comparison, half-chip hypotheses are ignored.

TABLE I

Timing Uncertainty Comparison

| | Number of Hypotheses Required | | |
|---|---|---|---|
| System | First Stage | Second Stage | Total |
| Conventional | N/A | N/A | ≈ 12,500 |
| L = 128 | 128 | 96 | 224 |
| L = 256 | 256 | 48 | 304 |
| L = 512 | 512 | 24 | 536 |
| L = 1024 | 1024 | 12 | 1036 |

The reduction in the number of hypotheses becomes more significant when frequency uncertainty is considered. According to one embodiment of the present invention, frequency uncertainty is resolved during the transmission of first stage preamble 560 while timing uncertainty is completely resolved during the transmission of second stage preamble 570. In this embodiment, the number of hypotheses required during first stage preamble 560 is increased by a factor of the number of frequency hypotheses (e.g. N) tested while the number of hypotheses required by second stage preamble 570 remains unchanged. The number of frequency hypotheses, N, depends on factors well known in the art such as the expected magnitude of Doppler and other frequency shifting effects, as well as the size and number of frequency "bins" used for dividing up the total frequency space to be searched. The number of hypotheses required to resolve both timing and frequency using the same systems as in Table I above, are compared in Table II.

TABLE II

Frequency and Timing Uncertainty Comparison

| | Number of Hypotheses Required | | |
|---|---|---|---|
| System | First Stage | Second Stage | Total |
| Conventional | N/A | N/A | ≈ 12,500*N |
| L = 128 | 128*N | 96 | 128*N + 96 |
| L = 256 | 256*N | 48 | 256*N + 48 |
| L = 512 | 512*N | 24 | 512*N + 24 |
| L = 1024 | 1024*N | 12 | 1024*N + 12 |

VII. Access Channel Transmitter

Figure 6:
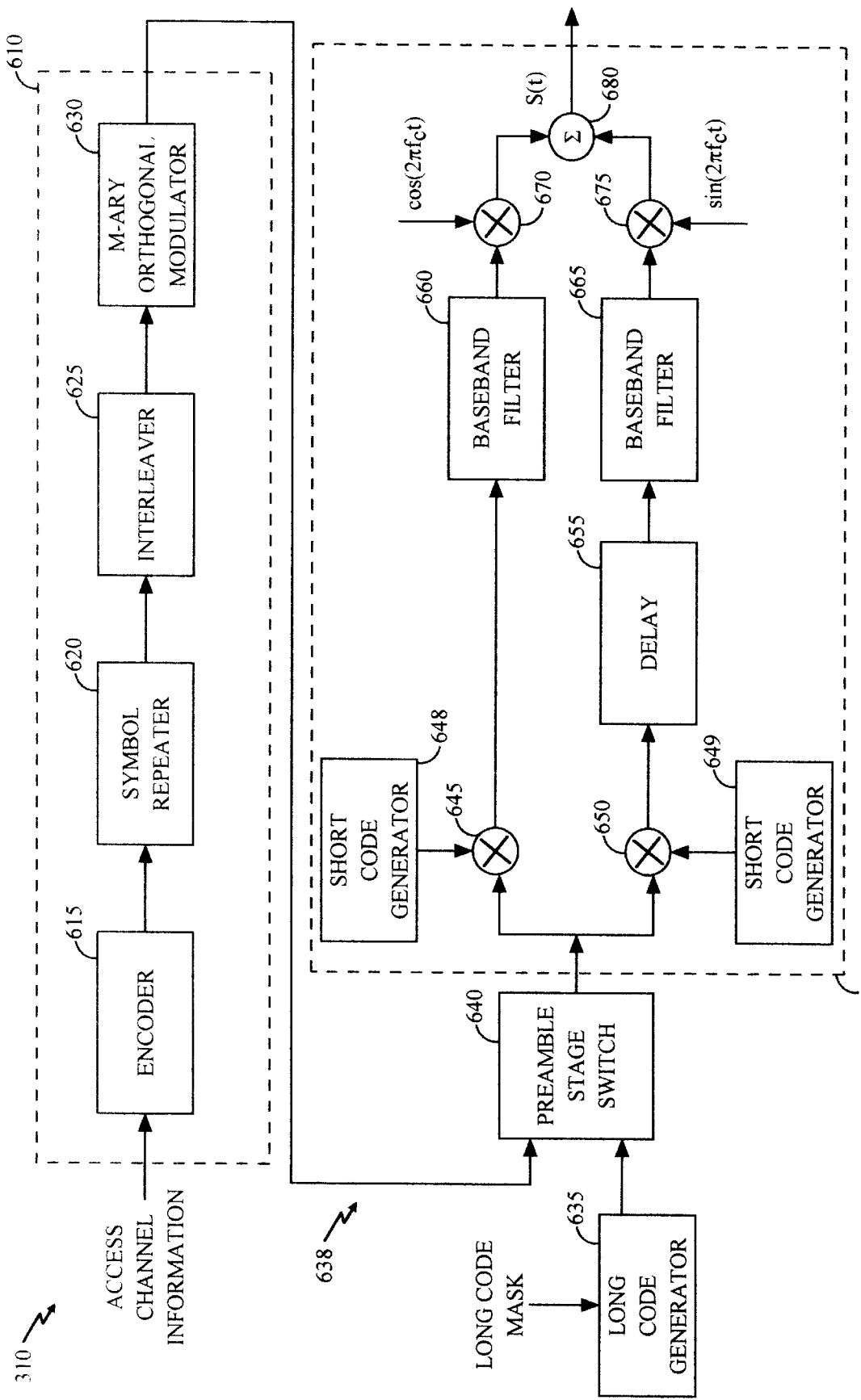
FIG. 6 is a block diagram illustrating an access channel transmitter according to one embodiment of the present invention.

FIG. 6 is a block diagram illustrating an example of an access channel transmitter 310 according to one embodiment of the present invention. Access channel transmitter 310 includes a transmit data preprocessor 610, a long code generator 635, a preamble stage switch 640, and a transmit data postprocessor 690.

Transmit data preprocessor 610 preprocesses information to be transmitted according to various signal processing techniques utilized in CDMA communications. In an exemplary embodiment of the present invention, transmit data preprocessor 610 includes an encoder 615, a symbol repeater 620, an interleaver 625, and a M-ary orthogonal modulator 630. Transmit data preprocessor 610 may include these elements as well as other preprocessing elements without detracting from the scope of the present invention. Those skilled in the art are familiar with the various types of signal processing and associated elements that are used to prepare information signals.

An exemplary embodiment of transmit data preprocessor 610 will now be described. In this embodiment, encoder 615 is a convolutional encoder that encodes the data using generator functions well known in the art. Encoder 615 receives data input as bits and outputs data as code symbols. Symbol repeater 620 repeats the code symbols received from encoder 615, so that the total number of code symbols per frame is maintained at various data rates. Interleaver 625, generally a block interleaver, interleaves the code symbols according to well-known techniques. M-ary orthogonal modulator 630 modulates the interleaved code symbols using an M-ary orthogonal code modulation process. These M-ary orthogonal codes may be Walsh functions or codes, which are commonly used in CDMA communication systems, as is well known.

Each group of $\log_2 M$ code symbols is mapped into one of M mutually exclusive orthogonal modulation symbols which can be referred to as Walsh symbols, when Walsh codes are used for the orthogonal codes. In this embodiment of the present invention, a 64-ary orthogonal modulator is used. Thus, in this embodiment, each Walsh symbol consists of 64 Walsh chips, and 6 code symbols are mapped to one Walsh symbol or orthogonal function. As would be apparent to those skilled in the art, other code lengths can be used with different sets or numbers of code symbols.

Preamble stage switch 640 receives data from transmit data preprocessor 610 and long PN code 450 from long code generator 635. Preamble stage switch 640 outputs data to transmit data postprocessor 690. Preamble stage switch 640 is described in further detail below.

Transmit data postprocessor 690 postprocesses information out of preamble stage switch 640 prior to being transmitted. In an exemplary embodiment of the present invention, transmit data postprocessor 690 includes an I-channel modulator 645, an I-channel short code generator 648, a Q-channel modulator 650, a Q-channel short code generator 649, a delay or delay element 655, an I-channel baseband filter 660, a Q-channel baseband filter 665, an I-channel carrier signal modulator 670, a Q-channel carrier signal modulator 675, and a signal combiner 680. Transmit data postprocessor 690 may include these elements as well as other postprocessing elements without detracting from the scope of the present invention. For example, a transmitted signal may not be comprised of in-phase and quadrature components as discussed above. In other words, phase shift keying may not be used by communication system 100. In this example, only one signal path in transmit data postprocessor 690 may be used. Thus, only one of short code generators 648, 649, one of baseband filters 660, 665, and one of carrier signal modulators 670, 675 are employed in this example as would be apparent. In any case, transmit data postprocessor 690 performs various filtering and modulation operations according to techniques well known in CDMA communications.

In a preferred embodiment of the present invention, the output from preamble stage switch 640 is quadrature spread using short PN code pair 440 from short code generators 648, 649 via modulators 645 and 650. Short PN code pair 440 comprises sequences sometimes referred to as a Q pilot PN sequence and an I pilot PN sequence. This nomenclature is useful for embodiments in which short code pair 440 is chosen to match forward link short PN codes, as in terrestrial cellular and some satellite communication systems. Otherwise, the term "pilot" need not be used to reference codes used only for the reverse link, where no pilot is used, or only for access channels. Short code generator 648 generates the I PN ($PN_I$) sequence. Short code generator 649 generates the Q PN sequence ($PN_Q$). The I and Q sequences may be entirely different sequences or the same sequence with one sequence offset with a delay from the other sequence.

In an alternate embodiment (not shown), short code generators 648, 649 are replaced with a single short code generator 648 and a delay. In this alternate embodiment, the output of short code generator is directly applied to modulator 645 and applied to modulator 650 subsequent to being delayed. Modulators 645, 650 may be implemented using combiners, multipliers, or modulo-2 adders or other techniques as would be apparent.

In one embodiment of the present invention, after being modulated by short code generator 649, the $PN_Q$ sequence is delayed by half a PN chip time with respect to the $PN_I$ sequence via delay 655. In this embodiment of the present invention, the half chip delay provides offset for quadrature phase shift keying and improves a power envelope for subsequent baseband filtering.

The outputs from the spreading operations are applied to baseband filters 660, 665 and modulated by a carrier signal via modulators 670, 675, respectively. The resulting modulated signals are combined using a combiner 680 and transmitted according to well known communication techniques.

VII. Preamble Stage Switch

Figure 7:
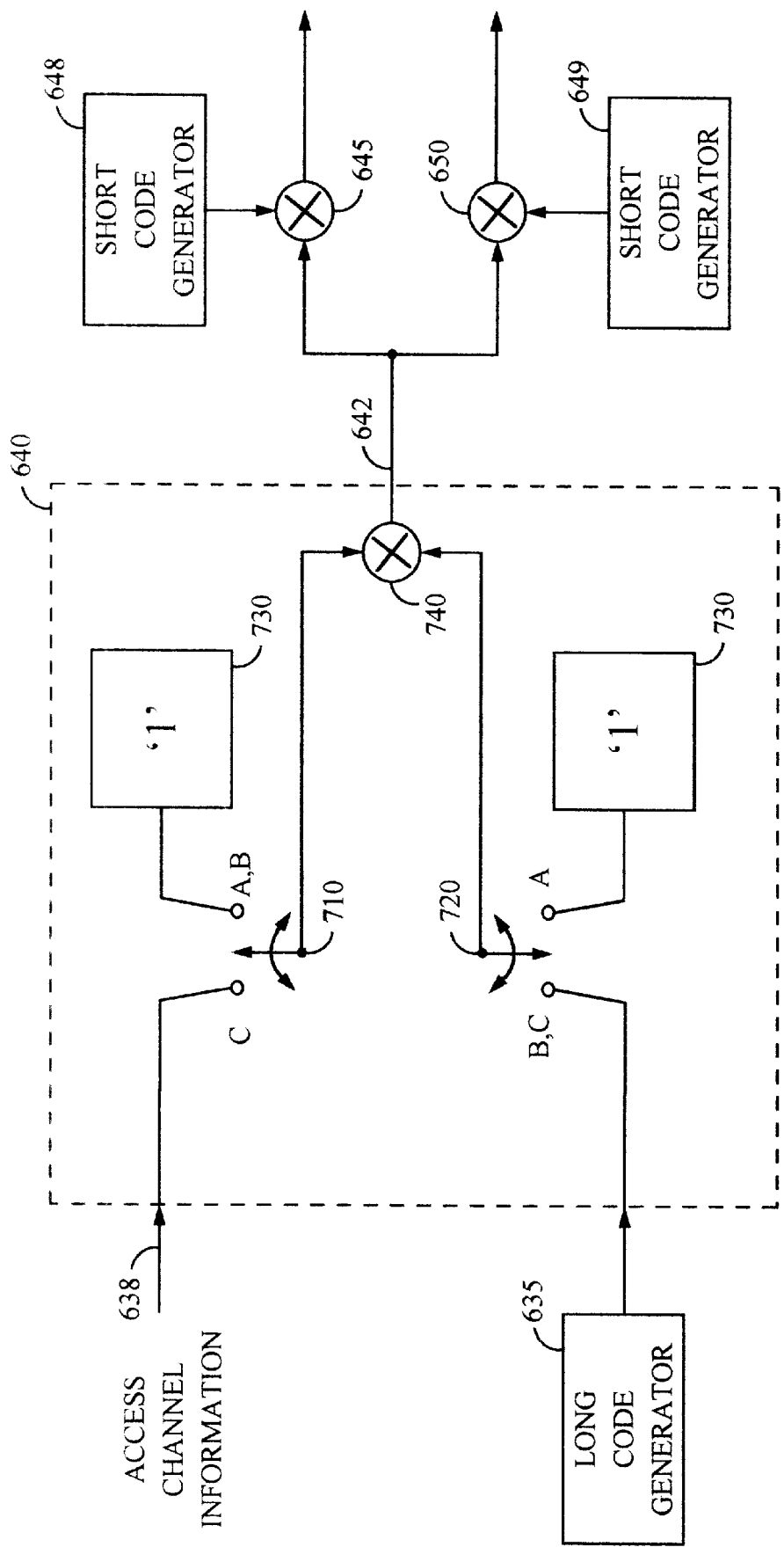
FIG. 7 is a block diagram illustrating a preamble stage switch of the access channel transmitter of FIG. 6 in further detail.

FIG. 7 illustrates an example implementation of preamble stage switch 640 in further detail. Preamble stage switch 640 includes a first switch 710, a second switch 720, two null code generators 730, and a modulator (or spreading element) 740. First switch 710 includes two terminal positions where a first terminal position is marked "A,B" and a second terminal position is marked "C." Second switch 720 includes two terminal position positions where a first terminal position is marked "A" and a second terminal position is marked "B,C." "A" identifies the terminal position of first switch 710 and second switch 720 during generation or transmission of first stage preamble 560. "B" identifies the terminal position of first switch 710 and second switch 720 during generation or transmission of second stage preamble 570. "C" identifies the terminal position of first switch 710 and second switch 720 during generation of message stage 580.

The operation of preamble stage switch is now described with reference to FIG. 5 and FIG. 7. During first stage preamble 560 of access probe 510, first switch 710 and second switch 720 are each positioned at their respective terminal positions marked "A." In this position, first switch 710 passes null data to modulator 740 while second switch 720 also passes null data to modulator 740. During first stage preamble 560, output 642 is comprised of null data. This null data is modulated by short PN code pair 440 as discussed above. Thus, during first stage preamble 560, null data is modulated by short PN code pair 440 and not modulated by long PN code 450.

Null data refers to data with a constant or known value, e.g., either all "0"s or all "1"s, or a known pattern, e.g.

alternating "1" and "0"s, etc. Null data represents a fixed pattern that is known to the receiver to aid in acquiring access probe 510. Null data does not contain any message information. In this embodiment of the present invention, null data means all "1"s.

After a receiver, such as access channel receiver 320, has had a sufficient time to determine short PN code pair 440 from first stage preamble 560, second stage preamble 570 is transmitted. During generation or transmission of second stage preamble 570, first switch 710 and second switch 720 are positioned at their respective terminal positions marked "B." In this position, first switch 710 continues to pass null data to modulator 740 while second switch 720 passes long PN code 450 to modulator 740. During generation or transmission second stage preamble 570, output 642 is comprised of null data modulated by long PN code 570. Output 642 is subsequently modulated by short PN code pair 440 as discussed above. Thus, during second stage preamble 570, null data is modulated by both long PN code 450 and short PN code pair 440.

After a receiver (access receiver 320) has had a sufficient time to determine short PN code pair 440 from first has had a sufficient time to determine short PN code pair 440 from first as had a sufficient time to determine long PN code 450 from second stage preamble 570, message stage 580 is transmitted. During the generation or transmission of message stage 580, first switch 710 and second switch 720 are positioned at the respective terminal positions marked "C." In this position, first switch 710 passes access channel information 638 to modulator 740 while second switch 720 continues to pass long PN code 450 to modulator 740. During message stage 580, output 642 is comprised of message data modulated by long PN code 570. Output 642 is subsequently modulated by short PN code pair 440 as discussed above. Thus, during message stage 580, message data is modulated by both long PN code 450 and short PN code pair 440.

Figure 8:
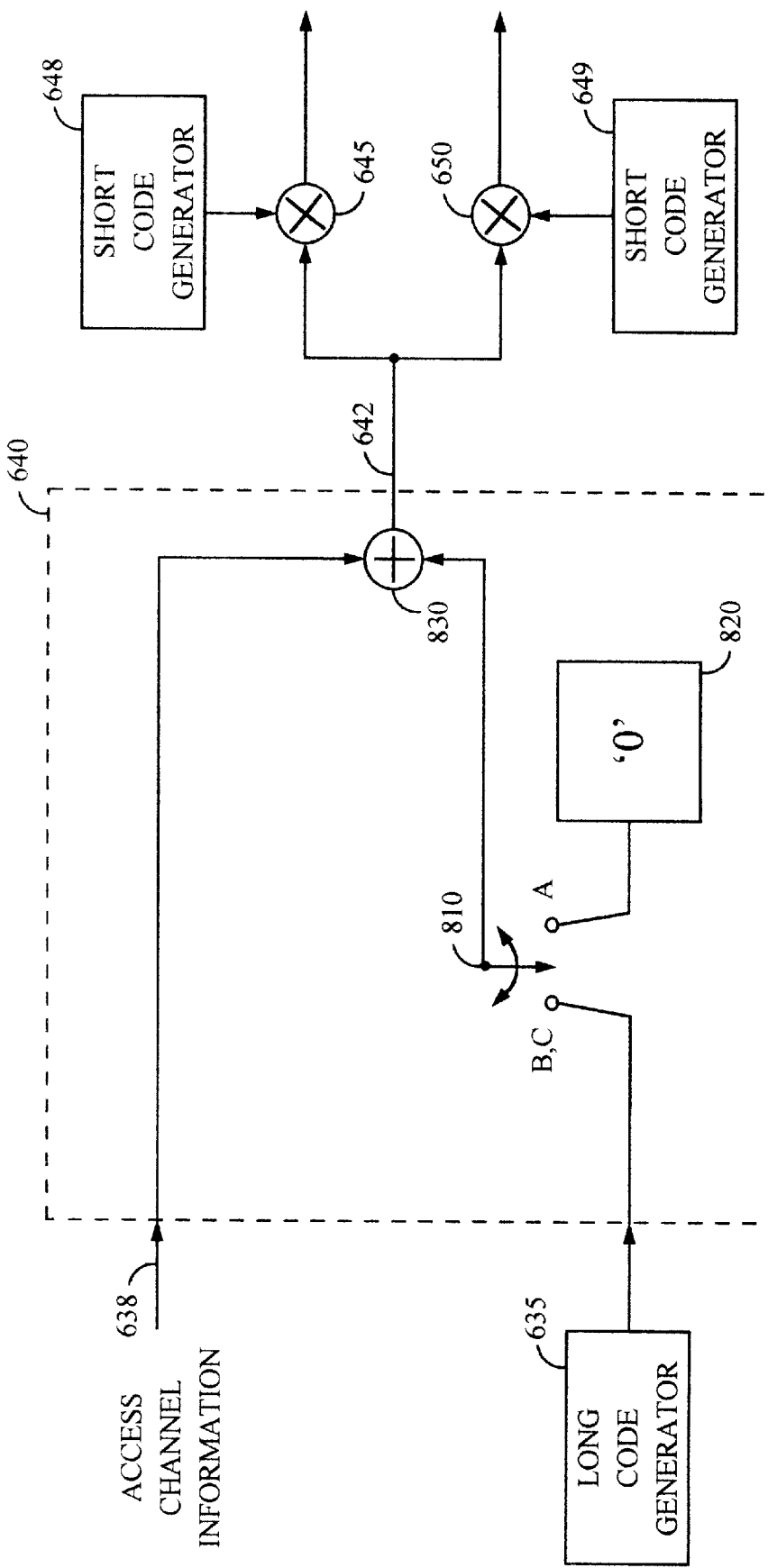
FIG. 8 is a block diagram illustrating another embodiment of a preamble stage switch of the access channel transmitter of FIG. 6 in further detail.

FIG. 8 illustrates another example implementation of preamble stage switch 640 in further detail. In this embodiment, preamble stage switch 640 includes a switch 810, a null code generator 820, and a modulator (or spreading element) 830. Switch 810 includes two terminal positions where a first terminal position is marked "A" and a second terminal position is marked "B,C." "A" identifies the terminal position of switch 810 during first stage preamble 560. "B" identifies the terminal position of switch 810 during second stage preamble 570. "C" identifies the terminal position of switch 810 during generation or transmission of message stage 580.

The operation of preamble stage switch 640 in this embodiment is now described with reference to FIG. 5 and FIG. 8. During first stage preamble 560 of access probe 510, switch 810 is positioned at the terminal position marked "A." In this position, switch 810 passes all "0"s from null data generator 820 to modulator 830. At the same time, the access channel information applied to access channel transmitter 310 is comprised of null data (i.e., either "0" or "1"s). This data is generated within and provided by known user terminal transmission elements using techniques known in the art, under the control of user terminal controllers. For example, the input to encoder 615 can be controlled to provide a particular desired output, or the output of modulator 630 or preprocessor 610 can be interrupted, and the input for preamble switch 640 connected to another source that generates the null data. Thus, access channel information 638 is comprised of null data as processed by transmit data preprocessor 610. Access channel information 638 is applied directly to modulator 830.

The particular combination of spreading element 830 and null data generator 820 shown in FIG. 8 ensures that when access channel information 638 is modulated by the output of null data generator 820 the result is identical to access channel information 638 which, as discussed above, is comprised of null data. As would be apparent, other combinations of these elements would similarly ensure that output 642 is comprised of access channel information 638. Output 642 is then modulated by short PN code pair 440 as discussed above. As in the previously discussed embodiment, during first stage preamble 560, the null data of output 642 is modulated by short PN code pair 440 and not modulated by long PN code 450.

After a receiver, such as access channel receiver 320, has had a sufficient time to determine short PN code pair 440 from first stage preamble 560, second stage preamble 570 is transmitted. During transmission of second stage preamble 570, switch 810 is positioned to the terminal position marked "B." In this position, switch 810 passes long PN code 450 to modulator 830. Meanwhile, the access channel information applied to access channel transmitter continues to be comprised of null data. During second stage preamble 570, output 642 is comprised of null data modulated by long PN code 570. Output 642 is subsequently modulated by short PN code pair 440 as discussed above. Thus, during second stage preamble 570, null data is modulated by both long PN code 450 and short PN code pair 440.

After a receiver (access receiver 320) has had a sufficient time to determine long PN code 450 from second stage preamble 570, message stage 580 is transmitted. During the transmission of message stage 580, switch 810 is positioned at the position marked "C." In this position, switch 810 continues to pass long PN code 450 to modulator 830. At the same time, the access channel information applied to access channel transmitter becomes message data as opposed to null data. Thus, access channel information 638 is message data as processed by transmit data preprocessor 610. Accordingly, during message stage 580, output 642 is comprised of message data modulated by long PN code 570. Output 642 is subsequently modulated by short PN code pair 440 as discussed above. Thus, during message stage 580, message data is modulated by both long PN code 450 and short PN code pair 440.

IX. Access Channel Receiver

Figure 9:
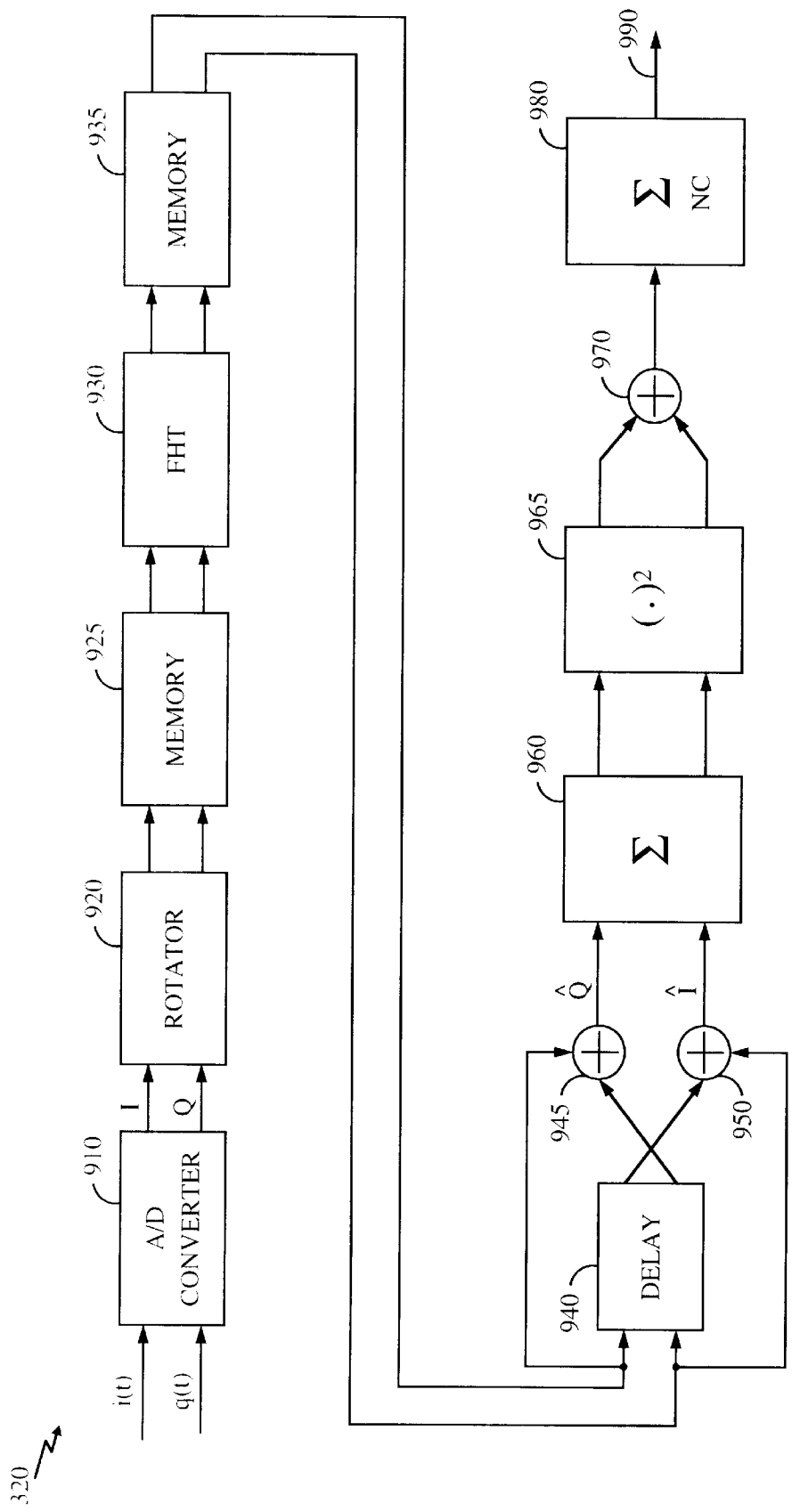
FIG. 9 is a block diagram illustrating an access channel receiver according to one embodiment of the present invention.

FIG. 9 is a block diagram illustrating an example implementation of an access channel receiver 320 according to one embodiment of the present invention. Access channel receiver 320 includes an analog-to-digital (A/D) converter 910, a rotator 920, a first memory 925, a fast Hadamard transformer (FHT) 930, a second memory 935, a delay 940, summers 945 and 950, a coherent integrator 960, a squaring operator 965, a channel summer 970, and a non-coherent integrator 980.

A/D converter 910 receives I,Q channel signals from an antenna (not shown) and quantizes the received signals. Rotator 920 adjusts a frequency of the received signals in order to remove a frequency uncertainty in the received signals as a result of Doppler or other known effects.

The output from rotator 920 is stored in memory 925. FHT 930 performs a fast Hadamard transformation (FHT) operation according to well known techniques. The output from FHT 930 is stored in memory 935. Memory 925 and memory 935 operate according to a well known process that permutes data before and after the FHT operation. This process quickly and efficiently determines the possible number of offsets for the short PN code pair 440 in view of the possible timing uncertainty. The output of memory 925, FHT 930, and memory 935 is the periodical autocorrelation of short PN code pair 440.

The remaining portions of access channel receiver 320 compute the energy of the received signal according to well known communication techniques. Delay 940 and summers 945 and 950 compute estimates of the in-phase and quadrature components of the received signal. Coherent integrator 960 accumulates each of the in-phase and quadrature components over a preselected period. Typically, this period corresponds to a symbol period. Squaring operator 965 determines a magnitude for each of the accumulated components. These magnitudes are referred to as coherent sums. Channel summer 970 combines the two coherent sums from the in-phase and quadrature channels. Non-coherent integrator 980 accumulates the combined coherent sums over an interval commencing and ending at Walsh code boundaries to provide a non-coherent combination of sums 990. Non-coherent sum 990 is related to the net energy of the communication signal correlated or despread with a particular timing offset of short PN code pair 440. Non-coherent sum 990 varies in value depending on whether or not a timing offset of short PN code pair 440 corresponds to the timing or offset in timing of the communication signal being acquired.

Non-coherent sum 990 is compared with one or more thresholds (not shown) to establish a minimum energy level for determining proper signal correlation and thus timing alignment. When non-coherent sum 990 exceeds the one or more thresholds, the timing offset of short PN code pair 440 is the selected timing offset that is subsequently used for tracking and demodulating the communication signal. If non-coherent sum 990 does not exceed the threshold, a new timing offset (i.e., another hypothesis) is tested and the aforementioned accumulation and thresholding or threshold comparison operations are repeated.

Figure 10:
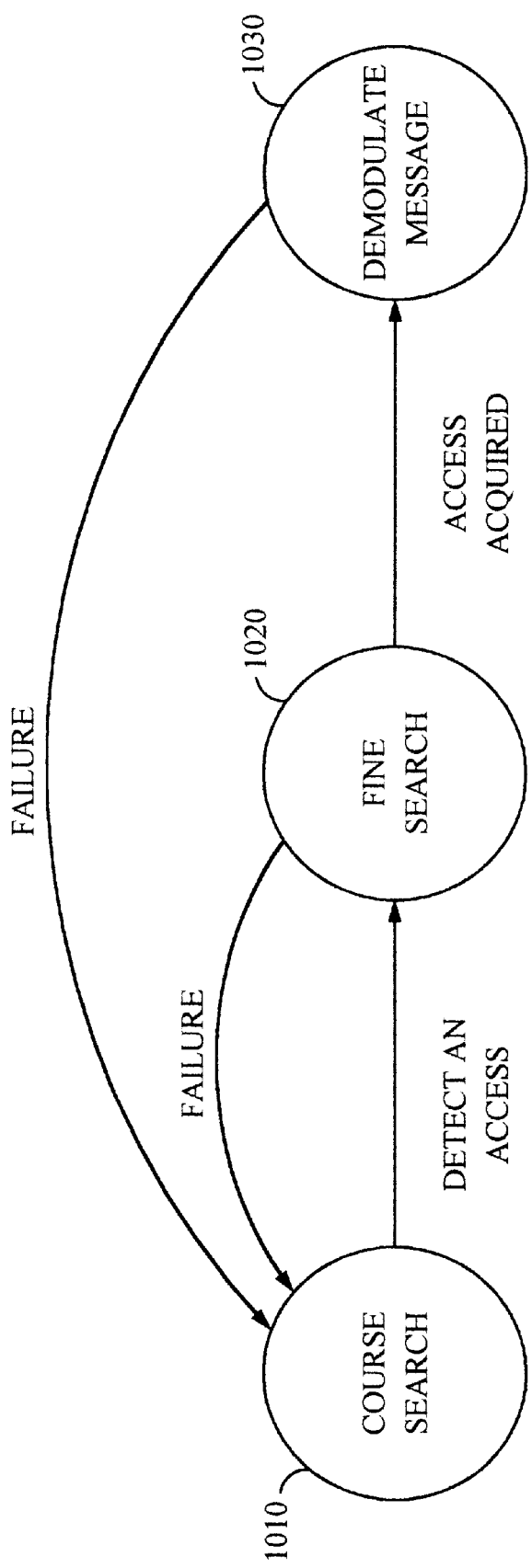
FIG. 10 is a state diagram illustrating the operation of an access channel receiver according to one embodiment of the present invention.

FIG. 10 is a state diagram illustrating the operation of one embodiment of access channel receiver 320. The state diagram includes a coarse search state 1010, a fine search state 1020, and a demodulate message state 1030.

Access channel receiver 320 begins operating in coarse search state 1010 searching for access probe 510. During coarse search state 1010, access channel receiver 320 performs a coarse search. According to a preferred embodiment of the present invention, a coarse search comprises a search in time and a search in frequency. The search in time attempts to lock onto short PN code pair 440 used in access probe 510. In particular, this search attempts to determine the timing offset for or of short PN code pair 440. The search in frequency attempts to resolve the frequency uncertainty in access probe 510.

The searches in time and frequency can be performed in either series or parallel. Because the timing uncertainty is expected to be larger than the frequency uncertainty, one embodiment of the present invention performs a parallel search in time and a serial search in frequency. This embodiment is particularly useful when FHT 930 is available in access channel receiver 320. In this embodiment, rotator 920 increments frequency by a predetermined amount based upon an expected range of frequency uncertainty. At each frequency increment, FHT 930 performs a parallel search for the timing of short PN code pair 440. A particular frequency increment and a particular timing of short PN code pair 440 maximize output 990 out of non-coherent integrator 980. If the maximum output 980 exceeds a predetermined threshold, coarse search has detected an access probe 510. When this occurs, the particular frequency increment resolves the frequency uncertainty and the timing of short PN code pair 440 partially resolves the timing uncertainty.

If the maximum output 990 does not exceed a predetermined threshold, coarse search has not detected access probe 510. In this event, access channel receiver 320 remains in coarse search state 1010.

Upon detecting an access probe 510, access channel receiver 320 changes from coarse search state 1010 to fine search state 1020. Upon changing from coarse search state 1010 to fine search state 1020, access channel receiver 320 changes characteristics in order to acquire long PN code 450. In particular, the operation of memories 925, 935 and FHT 930 is different for long PN code 450 than they are for short PN code pair 440, as would be known. According to one embodiment of the present invention, memories 925, 935 and FHT 930 are reconfigured to search for long PN code 450. In another embodiment, separate dedicated access channel receivers 320 are used. A short code access channel receiver 320 is used to acquire short PN code pair 440, and a long code access channel receiver 320 is used to acquire long PN code 450. In this embodiment, memories 925, 935 and FHT 930 are designed to acquire either short PN code pair 440 or long PN code 450, respectively. In this embodiment, short code access channel receiver 320 hands off the timing of short PN code pair 440 to long code access channel receiver 320 during the transition from coarse search state 1010 to fine search state 1020.

During fine search state 1020, access channel receiver 320 performs a fine search. According to a preferred embodiment of the present invention, a fine search comprises only a search in time. The fine search attempts to lock onto long PN code 450 used in access probe 510. During the fine search, the particular frequency increment and the timing of short PN code pair 440 obtained during coarse search state 1010 are used to completely resolve the timing uncertainty in access probe 510.

A similar process to that described above with respect to the coarse search is used to acquire or lock on to long PN code 450. A particular timing of long PN code 450 maximizes output 990 out of non-coherent integrator 980. If the maximum output 990 exceeds a predetermined threshold, fine search has acquired an access probe 510. When this occurs, the particular timing of long PN code 450 completely resolves the timing uncertainty.

If the maximum output 990 does not exceed a predetermined threshold, the fine search fails to acquire access probe. In this event, access channel receiver 320 changes from fine search state 1020 to coarse search state 1010 to attempt to detect an access probe 510.

Upon acquiring an access probe 510, access channel receiver 320 changes from fine search state 1020 to demodulate message state 1030. During demodulate message state 1030, access channel receiver 320 demodulates the message 530 included in access probe 510 using the particular frequency increment and the timing obtained during fine search state 1020.

If output 990 drops below a predetermined threshold during demodulate message state 1030, access channel receiver 320 has lost acquisition of access probe 510. This will occur in a variety of circumstances including completion of the transmission of access probe 510 or some failure. Regardless of the cause, access channel receiver 320 changes from demodulate message state 1030 to coarse search state 1010 to attempt to detect an access probe 510.

X. Conclusion

Although the invention has been described in detail in terms of specific embodiments, various modifications can be made without departing from the scope of the invention. For example, the invention is equally suited for transmissions other than access channel transmissions that are spread with multiple code sequences.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

It is claimed:

1. A system for wireless communication comprising:
   a transmitter for transmitting an access probe including a preamble and a message, said preamble having a first stage and a second stage, said first stage having data modulated by a first signal, said second stage having data modulated by a second signal and said first signal; and
   a receiver for receiving said access probe, said receiver including a coarse searcher and a fine searcher, said coarse searcher for determining a first timing offset of said first signal from said first stage of said preamble, and said fine searcher for determining a second timing offset of said second signal from said second stage and based on said first timing offset.

2. The system of claim 1, wherein said first signal and said second signal are pseudonoise sequences.

3. The system of claim 1, wherein said first signal and said second signal are encoding sequences.

4. The system of claim 1, wherein said first signal is a pair of quadrature spreading, pseudonoise sequences.

5. The system of claim 1, wherein said second signal is a channelizing pseudonoise sequence.

6. The system of claim 1, wherein said data of said first stage is null data.

7. The system of claim 6, wherein said data of said second stage is null data.

8. A method for transmitting an access probe, the access probe including a preamble and a message, the preamble having a first stage and a second stage, the method comprising the steps of:
   modulating the first stage of the preamble by a first signal;
   transmitting said modulated first stage of the preamble;
   modulating the second stage of the preamble by said first signal and a second signal;
   transmitting said modulated second stage of the preamble after transmitting said modulated first stage of the preamble;
   modulating the message with said first signal and said second signal; and
   transmitting said modulated message after transmitting said modulated second stage of the preamble.

9. The method of claim 8, wherein said modulated first stage of the preamble is transmitted for a sufficient time for a receiver to acquire a first timing offset of said first signal.

10. The method of claim 9, wherein said modulated second stage of the preamble is transmitted for a sufficient time for a receiver to acquire a second timing offset of said second signal.

11. The method of claim 8, wherein said first signal is a pair of quadrature spreading, pseudonoise sequences.

12. The method of claim 8, wherein said second signal is a channelizing pseudonoise sequence.

13. An access probe for allowing a receiver to rapidly determine a timing associated with the access probe, the access probe comprising:
   a preamble having a first stage and a second stage, said first stage modulated by a first code sequence, said second stage modulated by said first code sequence and a second code sequence,
   wherein said first stage is transmitted prior to said second stage to allow the receiver to determine a timing of said first code sequence modulated on said first stage of said preamble before determining a timing of said second code sequence modulated on said second stage of said preamble thereby reducing an amount of time required by the receiver to determine the timing.

14. The access probe of claim 13, further comprising a message following said preamble, said message modulated by said first code sequence and said second code sequence.

15. The access probe of claim 13, wherein said first code sequence is a pair of quadrature spreading, pseudonoise sequences and said second code sequence is a channelizing pseudonoise sequence.

16. A method for acquiring a transmission at a receiver from a transmitter, the transmission having a preamble, the preamble having a first stage and a second stage, the method comprising the steps of:
   performing a coarse search on the transmission received by the receiver during the first stage of the preamble, wherein the first stage of the preamble is modulated by a first signal, said coarse search to determine a timing offset of said first signal;
   performing a fine search on the transmission received by the receiver during the second stage of the preamble, wherein the second stage of the preamble is modulated by said first signal and a second signal, said fine search to determine a timing offset of said second signal, wherein said timing offset of said second signal is determined using said first signal and said timing offset of said first signal; and
   demodulating the transmission using said first signal, said second signal, said timing offset of said first signal, and said timing offset of said second signal.

17. The method of claim 16, wherein said first signal and said second signal are pseudonoise sequences.

18. The method of claim 16, wherein said first signal is a pair of quadrature spreading, pseudonoise sequences and said second signal is a channelizing pseudonoise sequence.

19. The method of claim 16, wherein the first stage of the preamble is comprised of null data.

20. The system of claim 16, wherein the second stage of the preamble is comprised of null data.

21. A method for using an access signal in a wireless communication system comprising:
   transmitting an access probe including a preamble and a message, said preamble having a first stage and a second stage, said first stage having data modulated by a first signal, said second stage having data modulated by a second signal and said first signal;
   receiving said access probe;
   determining a first timing offset of said first signal from said first stage of said preamble; and
   determining a second timing offset of said second signal from said second stage and based on said first timing offset.

* * * * *